United States Patent
Greenfield

(10) Patent No.: US 8,882,056 B2
(45) Date of Patent: Nov. 11, 2014

(54) TOP BEAM CLAMP

(75) Inventor: Elliott Greenfield, Elkins Park, PA (US)

(73) Assignee: Greenfield Mfg. Co. Inc., Philadelphia, PA (US)

( * ) Notice: Subject to any disclaimer, the term of this patent is extended or adjusted under 35 U.S.C. 154(b) by 81 days.

(21) Appl. No.: 13/397,927

(22) Filed: Feb. 16, 2012

(65) Prior Publication Data

US 2013/0214098 A1  Aug. 22, 2013

(51) Int. Cl.
*F16L 3/24* (2006.01)
*F16L 25/08* (2006.01)

(52) U.S. Cl.
CPC ... *F16L 3/24* (2013.01); *F16L 25/08* (2013.01)
USPC .............................. 248/72; 248/58; 248/228.6

(58) Field of Classification Search
CPC ............... F16L 3/11; F16L 3/24; F16L 3/133; F16L 25/08; B21D 53/56
USPC ............... 248/58, 62, 70, 72, 73, 74.1, 228.6, 248/228.1, 230.6, 229.15, 229.25; 29/525.02, 897; 72/379
See application file for complete search history.

(56) References Cited

U.S. PATENT DOCUMENTS

| 1,840,216 | A |   | 1/1932  | Tormo |
| 1,985,509 | A | * | 12/1934 | Lemont ........................ 403/209 |
| 2,326,261 | A | * | 8/1943  | Shippee et al. ............... 411/275 |
| 2,675,201 | A |   | 4/1953  | Friel |
| 2,996,570 | A |   | 8/1961  | Wilson |
| 3,126,182 | A |   | 3/1964  | Stamper |
| 3,276,800 | A |   | 10/1966 | Loudon |
| 3,321,161 | A | * | 5/1967  | Hirt ............................... 248/72 |
| 3,572,623 | A |   | 3/1971  | Lapp |
| 3,874,035 | A |   | 4/1975  | Schuplin |
| 3,949,880 | A | * | 4/1976  | Fortunato ............... 211/119.003 |
| 4,019,705 | A |   | 4/1977  | Habuda |
| 4,202,083 | A |   | 5/1980  | Gutner |
| 4,570,885 | A | * | 2/1986  | Heath ............................ 248/72 |
| 8,534,625 | B2| * | 9/2013  | Heath et al. ............. 248/226.11 |

FOREIGN PATENT DOCUMENTS

GB             660026 B1   10/1951

OTHER PUBLICATIONS

U.S. Appl. No. 13/303,101, not yet published, Nov. 2011, Greenfield.

* cited by examiner

*Primary Examiner* — Tan Le

(57) ABSTRACT

A pipe hanger clamp, formed by bending a flat section of metal bar or plate, has two vertical side members which have been cut so their side view is a "C" shape. The lower arms of these two side members are joined by a horizontally extended end wall, about which the side members are bent. Holes in the end wall receive a mounting set screw into a captured nut and another nut to hold a pipe hanger rod for supporting a pipe. An overhead support is clamped between the set screw and the upper arms of the C-shaped side members, such that the load applied to the rod is generally edgewise to the plate thickness, and does not provide an unbending force on the clamp.

1 Claim, 6 Drawing Sheets

SECTION I-I

SECTION II-II

TOP BEAM CLAMP

TECHNICAL FIELD

This invention relates to an improved clamp to attach pipe hangers to overhead structures, and relates to an improved method of making such a clamp.

In the construction and modification of buildings, it is often desirable to suspend piping from the ceiling, one common example being water sprinkler systems. A typical method for attaching a pipe to the ceiling utilizes the flanges of the ceiling support beams. A pipe hanger clamp fits over the edge of one of these flanges, and a pipe hanger rod attached to the clamp supports the pipe. This method is convenient because it permits the pipes to be hung after the building has been constructed.

BACKGROUND ART

A number of clamps have been developed, three of which are disclosed in U.S. Pat. Nos. 4,570,885, 3,276,800, 3,211, 161, and 3,572,623. These four patents generally indicate the state of the prior art. One approach to the manufacture of these clamps utilizes casting. A cast clamp has significant torsional stiffness. However, this manufacturing process is costly and labor intensive. Another approach contemplates plastically deforming a strip of material, usually steel, into a "U" shape. A hole is drilled into one of the arms of the clamp, and the hole is tapped to accommodate a set screw. When attached, the clamp is oriented so that the rounded portion is directly next to the tip of the supporting flange. This type of clamp can be manufactured inexpensively. However, unless made relatively thick steel, such a clamp the threaded connection tends to deform under heavy loading. Making the part thick enough to have sufficient threads to bear the load is the problem as the steel structure of the clamp would be sufficient in lighter and less costly gages of metal. Some manufacturers have used a friction drilling method to push metal to form a longer thread engagement (see FIG. 2 as prior art). This method marginally works but takes time to process as the metal must be friction heated to near molten state. The current invention traps ordinary nuts or other similar fasteners with full-length threads into the part. It may further allow the rod hanger to move and comply with shifting loads thus taking the stress off the clamping connection to the beam.

SUMMARY OF THE INVENTION

In accordance with the present invention, there is provided a pipe hanger clamp having two cantilevered support arms with clamping surfaces for engaging the same side of an I-beam. The relatively thin support arms have a height which is significantly greater than their width. However, because the support arms are a distance apart, the clamp is securely engaged with the supporting I-beam.

An end wall rigidly joins the two side members. A hole with a threaded fastener in the end wall accommodates a set screw for securely engaging the support arms with the I-beam. A second hole with a threaded fastener receives a threaded section of a pipe hanger rod.

In accordance with the method of the invention the clamp is manufactured from a single piece of flat metal bar stock. The plate is first blanked into the desired shape, preferably an "E" shape. The workpiece is subsequently bent into a "U"-shape about the middle tine of the "E" to form the clamp, which has two side members having a general C-shape. Two threaded receptacles are then inserted into the lower portion of the C-shape and trapped into the C-shape.

The female receptacle for the hanger rod is allowed to be not rigid and complies with movement of the installed hanger rod.

DETAILED DESCRIPTION OF THE INVENTION

Figure 1:
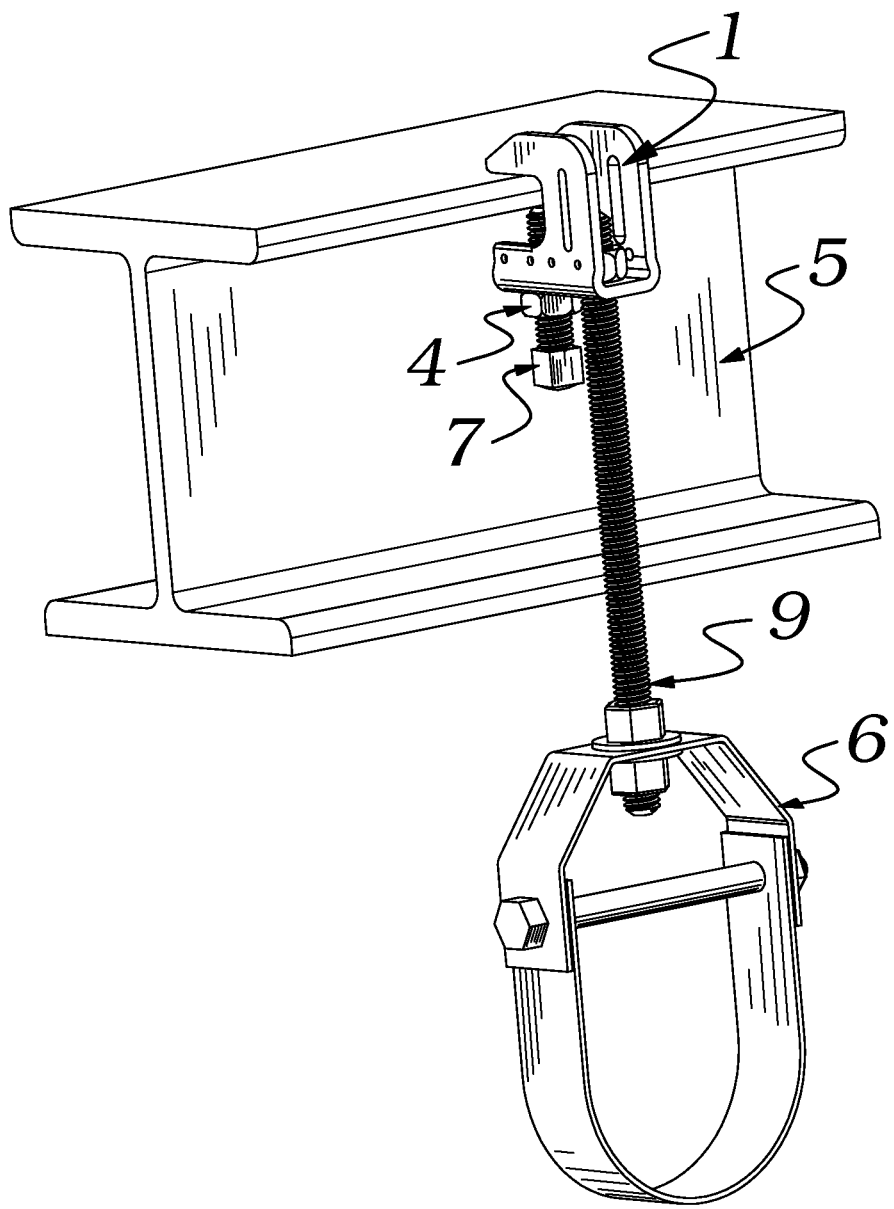
FIG. 1 is an isometric view of the preferred embodiment of the invention showing a typical use suspended on the top edge of a beam and connecting to a threaded hanger rod then to a clevis type pipe hanger.

FIG. 1 shows the principal embodiment of the invention, as it would be typically used. Here it is attached to the top of an "I" shaped beam 5 with an attached rod to which is suspended a clevis hanger 6 (U.S. Pat. No. 2,714,497). The set screw 7 is here shown with a locking nut 4 to affix the clamp more reliably as the design requires that the clamp should be applied with a limited torque to the clamp 8 so as not to distort the clamp or over stress it. The lock nut 4 is then applied to prevent the set screw 7 from loosening due to any structural vibration.

Figure 2:
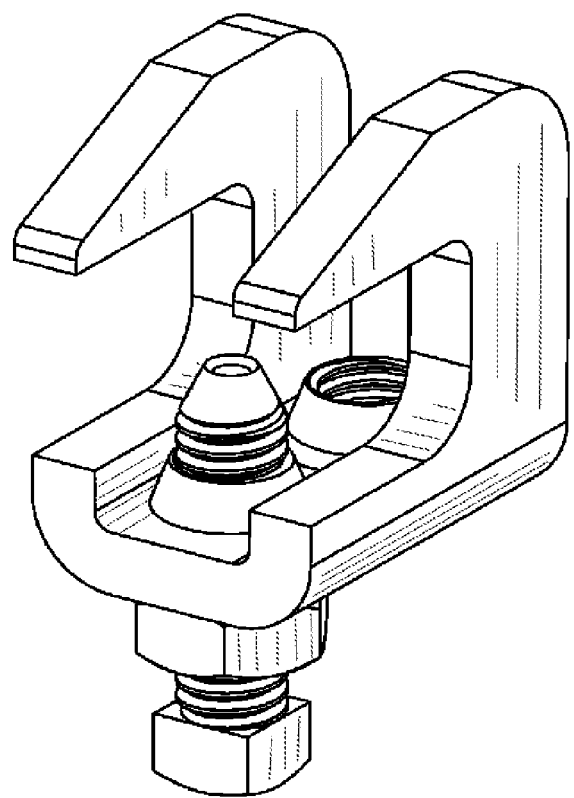
FIG. 2 shows prior art with thermally extruded threaded portion.
Figure 3:
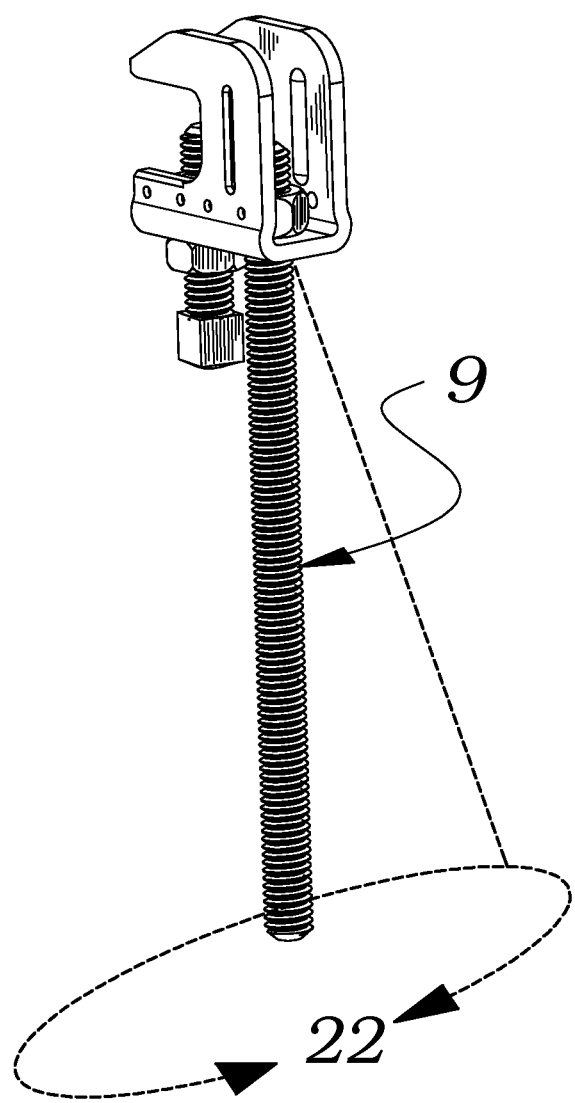
FIG. 3 shows the freedom of movement of the hanger rod so as to relieve stresses on the clamp.

FIG. 3 shows the added motion available with the preferred embodiment of this invention to allow for movement of the hanger rod 9 through and within circumference 22. Compare this to FIG. 2, (prior art) in which a rigid thread is formed into the clamp. This rigidity forces the sway of the hanger to dislodge the clamp from its anchorage, which is held only by clamp friction on the attached beam. Using independent nut fasteners this design is more flexible in its application and less expensive in its construction.

Figure 7:
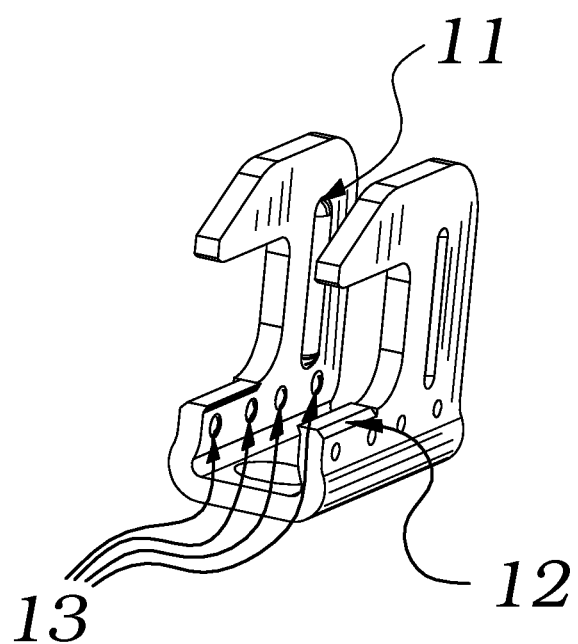
FIG. 7 is an isometric view of the bare clamp body showing the various features used to trap the female threaded receptacles.

In FIG. 7 one can see some embodiments of the invention in the various forms of embossments or lances which can be used to entrap the nuts these include but are not limited to: a rib 11, a bent edge 12 and multiple dimples 13. These features trap the nuts so they stay in place during the application of the clamp and in transport. Actual installation then traps and holds the components in final assembly.

Figure 4:
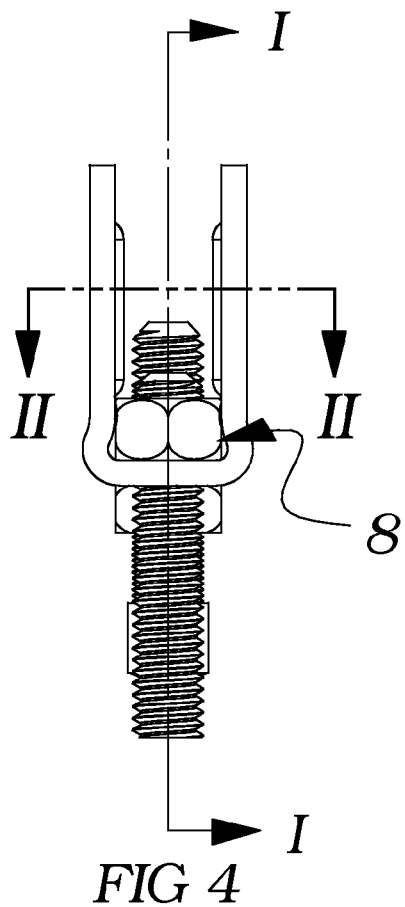
FIG. 4 is an end view of the clamp showing the section line locations for FIGS. 5 and 6.
Figure 5:
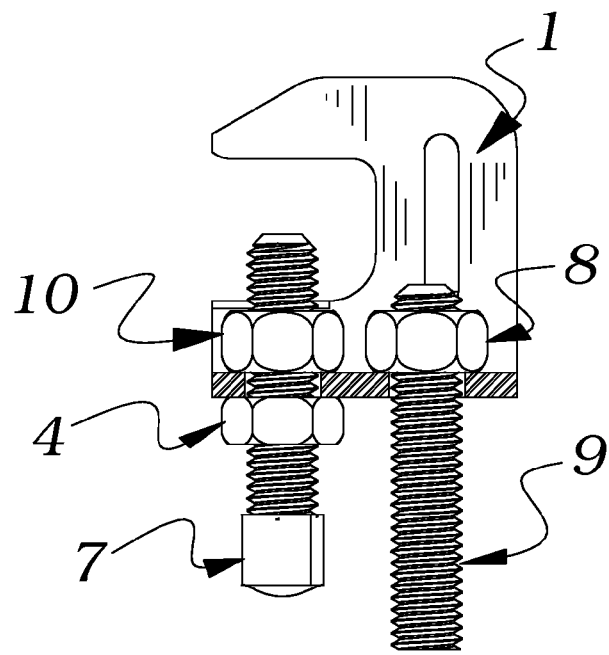
FIG. 5 is a section view showing hex nuts as threaded receptacles for the rod and clamping set screw.
Figure 6:
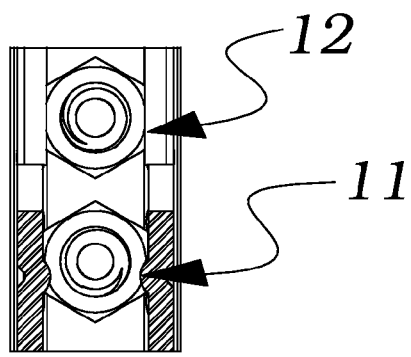
FIG. 6 is a section view showing the nut receptacles entrapped in the clamp.

In FIG. 4 one embodiment of the invention indicates the cut lines of the cross sectional views which follow. The first cross sectional view FIG. 5 shows a cut away of the clamp showing how the nuts 8 and 10 are seated in the clamp. Rod 9 is threaded to nut 8 to support the load while nut 10 is used to hold back set screw 7 against that which is clamped being held tightly by locking nut 4. Since nut 8 is not firmly held in the clamp some uplift from the pipe hanger rod would not dislodge the clamp. If desired however a lock nut could be added to restrict a limited amount of upward thrust. The open end of the clamp allows for verifying the full thread engagement of the hanger rod. While FIG. 6 shows how the rib 11 and bent edge 12 entrap the nuts so they don't fall out during transport of the product to the end user.

Figure 8:
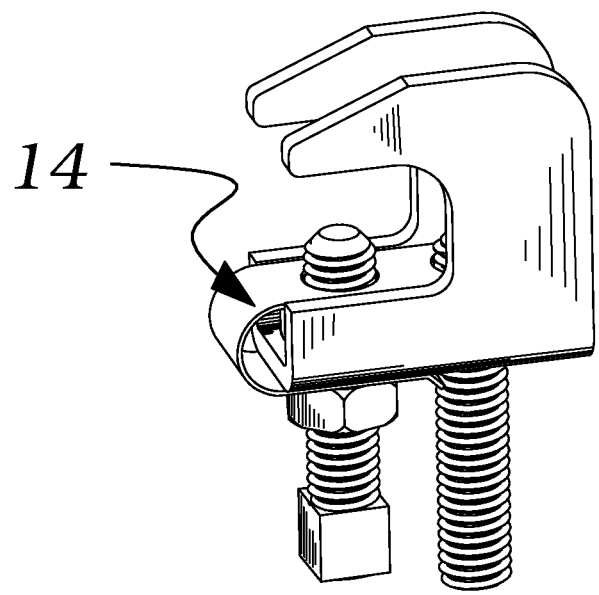
FIG. 8 is an isometric view of the clamp with a clip holding the nuts in place.
Figure 9:
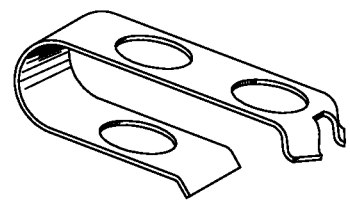
FIG. 9 is a view of a typical clip.

FIG. 8 shows another embodiment of the invention. Here a clip 14 is used to restrain the nuts in the clamp during shipment and installation. Once installed however the clip adds no structural additions to the clamp. The clip may be made from metallic or non metallic materials This embodiment is just another way to allow the hanger rod to have some limited movement. FIG. 9 shows one of many embodiments of the clip design.

By automatically inserting the nuts and or nut plates and set screw required during the manufacture of the clamp and by making the product out of pre-galvanized material and utilizing already available commercial fasteners, these designs afford substantial cost reductions to the end user. This invention is beneficial and a clear replacement for the currently imported cast versions or other pre-threaded versions of the product. Concurrently the non-rigid connection of the hanger rod in the non bar versions afford a more reliable connection to the beam during stress and vibration periods at no additional cost to the end user. The invention presented here offers substantial engineered improvements both in cost and functionality over existing designs.

What is claimed is:

1. A pipe hanger clamp assembly comprised of:
a bent metal U-formed E-shaped plate, having a middle tine and a pair of end tines with said middle tine cut as to form straight edges each parallel to and facing a straight edge on each respective one of said end tines such that the breadth of said middle tine is considerably greater than the breadth of said end tines, and further the outer edges of said end tines, being remote from said middle tine, are cut such that the outer edges of said end tines, taper towards the tips of said end tines, so that the tips of said end tines are wedge-shaped, and having two substantially round apertures central within said middle tine, the plate having been bent about said middle tine to form a generally U-form with a mostly flat bottom, with a portion of said middle tine forming the bight or end wall of the U-form and with the remainder of the E-shape forming the legs of the U-form, each leg forming a generally C-shaped side member, joined by the end wall with the portions of said middle tine forming lower support arms of the C-shaped members and with said end tines forming the upper arms of the C-shaped members, two female threaded receptacles contained within the U-form and aligned with each of the two substantially round apertures, a set screw threaded through the outer most female threaded receptacle, extending towards said end tines, such that an overhead support may be clamped between said set screw and said end tines, and means for holding the inner female threaded receptacle allowing limited angular and axial movement, while still retaining the inner female threaded receptacle within the bottom of the U-formed, E-shaped plate.

* * * * *